(12) United States Patent
Ycas (10) Patent No.: US 7,538,982 B2
(45) Date of Patent: May 26, 2009

(54) ADJUSTMENT SYSTEM USING BALL-ENDED GUIDE RODS TO ALIGN TAPE DRIVE HEADS

(75) Inventor: John Ycas, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 468 days.

(21) Appl. No.: 11/516,997

(22) Filed: Sep. 7, 2006

(65) Prior Publication Data

US 2007/0285846 A1 Dec. 13, 2007

Related U.S. Application Data

(60) Provisional application No. 60/804,498, filed on Jun. 12, 2006.

(51) Int. Cl.
*G11B 21/24* (2006.01)
(52) U.S. Cl. .................................................. 360/291.2
(58) Field of Classification Search ............. 360/291.2, 360/75, 76, 260, 261.1, 261.2, 261.3, 251, 360/251.1, 251.2, 77.13
See application file for complete search history.

(56) References Cited

U.S. PATENT DOCUMENTS

| | | | |
|---|---|---|---|
| 2,587,167 A | 2/1952 | Kelley | |
| 2,599,211 A | 6/1952 | Tilbury | |
| 3,353,300 A | 11/1967 | Wray | |
| 3,706,164 A | 12/1972 | Glause et al. | |
| 3,961,573 A | 6/1976 | Schmidt | |
| 4,158,212 A | 6/1979 | Dattilo | |
| 4,495,730 A | 1/1985 | Kennedy | |
| 4,616,280 A | 10/1986 | Kobayashi | |
| 4,776,134 A | 10/1988 | Romberg | |
| 4,796,385 A | 1/1989 | Tyler | |
| 5,394,651 A | 3/1995 | Vial | |
| 7,379,259 B2* | 5/2008 | Nayak et al. | 360/75 |
| 7,474,495 B2* | 1/2009 | Weng et al. | 360/77.13 |
| 2005/0162781 A1* | 7/2005 | McCarthy | 360/261.1 |
| 2007/0053110 A1* | 3/2007 | Harper | 360/261.1 |
| 2007/0076324 A1* | 4/2007 | Moore et al. | 360/261.1 |
| 2007/0279806 A1* | 12/2007 | Ycas | 360/261.1 |

\* cited by examiner

*Primary Examiner*—Tianjie Chen
(74) *Attorney, Agent, or Firm*—Baker Botts L.L.P.

(57) ABSTRACT

An example embodiment provides for an apparatus, for use in a tape drive system, that facilitates adjustment of azimuth and zenith orientations of a magnetic tape head. The apparatus includes a top and bottom plate located above and below an actuator assembly that includes a magnetic head. Also included are first and second ball-ended guide rods that each have ends that mate with corresponding top and bottom plate sockets. Azimuth and zenith adjustment is provided for via at least one azimuth adjustment screw and at least one zenith adjustment screw. Various aspects of the apparatus include independent adjustment of the zenith and azimuth, where adjustments to one does not affect the other. Another aspect includes the top plate remaining in a substantially horizontal plane when either the azimuth or the zenith is adjusted.

18 Claims, 9 Drawing Sheets

ADJUSTMENT SYSTEM USING BALL-ENDED GUIDE RODS TO ALIGN TAPE DRIVE HEADS

CROSS-REFERENCE TO RELATED APPLICATIONS

This application claims the benefit of U.S. Provisional Patent Application No. 60/804,498 filed on Jun. 12, 2006, which is incorporated herein by reference.

TECHNICAL FIELD

The present invention relates generally to tape drives.

BACKGROUND

In tape drive systems, magnetic head positioner systems that adjust azimuth and zenith of a magnetic head are well known in the art. Azimuth, of the magnetic head, generally refers to an orientation of the magnetic tape head across or parallel to a tape travel path and zenith generally refers to an orientation of the magnetic head in and out from (perpendicular to) the tape travel path.

Some prior art magnetic head positioner systems involve tying one corner of a top plate, of the system, to a bottom plate. Two jack screws and coil return springs are located at other corners of the top plate. One jack screw provides azimuth adjustment by while the other jack screw provides zenith adjustment. Typically, adjusting the zenith jack screw also affects the azimuth setting of the magnetic head to a degree. Similarly, adjusting the azimuth jack screw also affects the zenith setting of the magnetic head to a degree. As a result, achieving a desired azimuth and zenith for the magnetic head can be somewhat complicated.

Another drawback of prior art magnetic head positioner systems is that they generally include a significant number of parts due to the various screws, springs and other related components. Due to this, they tend to be difficult to assemble. An additional consequence of the number of parts is that prior art magnetic head positioner systems tend to occupy a significant amount of space in a drive housing. This aspect can be problematic in view of next generation drive housings that typically are smaller in height.

In view of the foregoing, a need exists in the art for a new tape positioner system that addresses the aforementioned deficiencies.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

One embodiment by way of non-limiting example provides for an apparatus, for use in a tape drive system, that facilitates adjustment of azimuth and zenith orientations of a magnetic tape head. The apparatus includes a top and bottom plate located above and below an actuator assembly that includes a magnetic head. Also included are first and second ball-ended guide rods that each have ends that mate with corresponding top and bottom plate sockets. Azimuth and zenith adjustment is provided for via at least one azimuth adjustment screw and at least one zenith adjustment screw. Various aspects of the apparatus include independent adjustment of the zenith and azimuth, where adjustments to one does not affect the other. Another aspect includes the top plate remaining in a substantially horizontal plane when either the azimuth or the zenith is adjusted.

In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Figure 1:
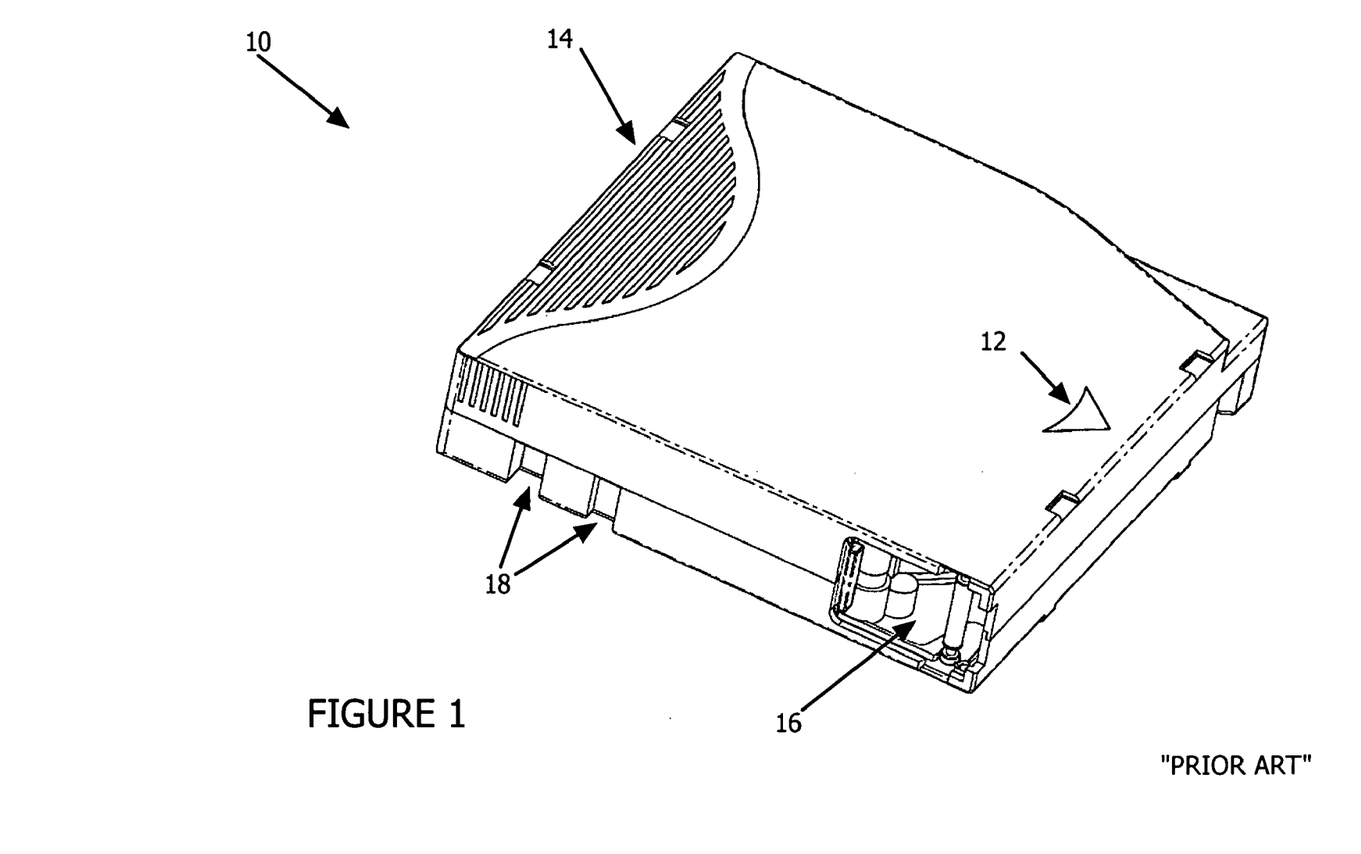
FIG. 1 illustrates an example LTO tape cartridge.
Figure 2:
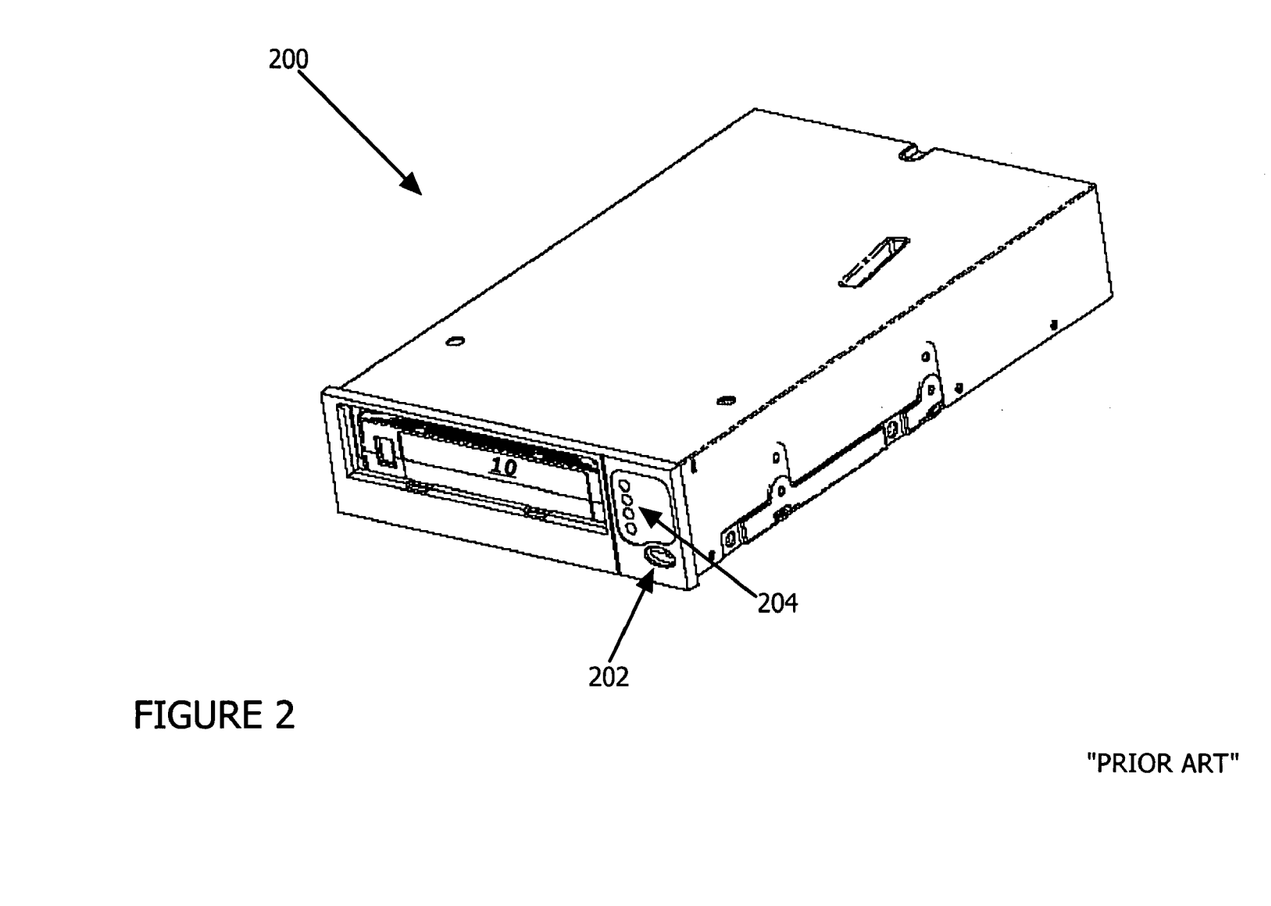
FIG. 2 illustrates an example LTO tape drive housing with the cartridge of FIG. 1 inserted.

FIG. 1 illustrates an example LTO tape cartridge 10 and FIG. 2 illustrates example LTO tape drive housing 200 with the cartridge 10 of FIG. 1 inserted. Cartridge 10 is inserted into drive 200 in a direction specified by arrow 12. Cartridge 10 also includes grip lines 14 for easy handling. Additionally, cartridge 10 includes various lock depressions 18 (also repeated on the opposite side) that mate with a male counterpart, in drive 200, to ensure a snug fit after cartridge 10 is inserted into drive 200. Drive 200 includes an eject button 202 and various indicators 204. The drive 200 may be designed to fit into a half-high 5.25 inch form factor for installation into a bay of a desktop or server box. Of course, other implementations are possible. For example, the drive 200 may be a stand-alone unit, such as a desktop drive that is external from a host computing system.

Figure 3:
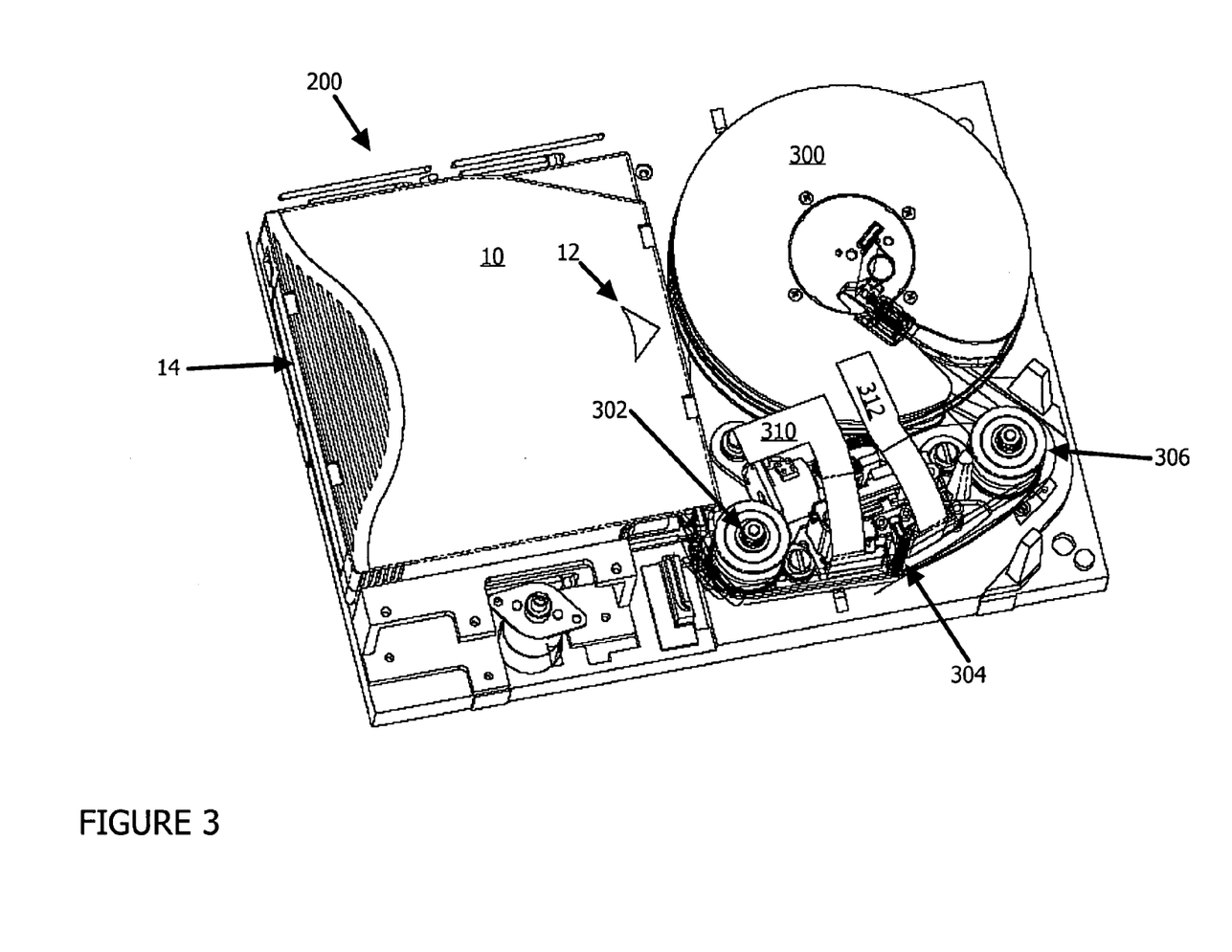
FIG. 3 is a top-down view of the cartridge inserted into the tape drive and further illustrates various internal tape drive parts.
Figure 4:
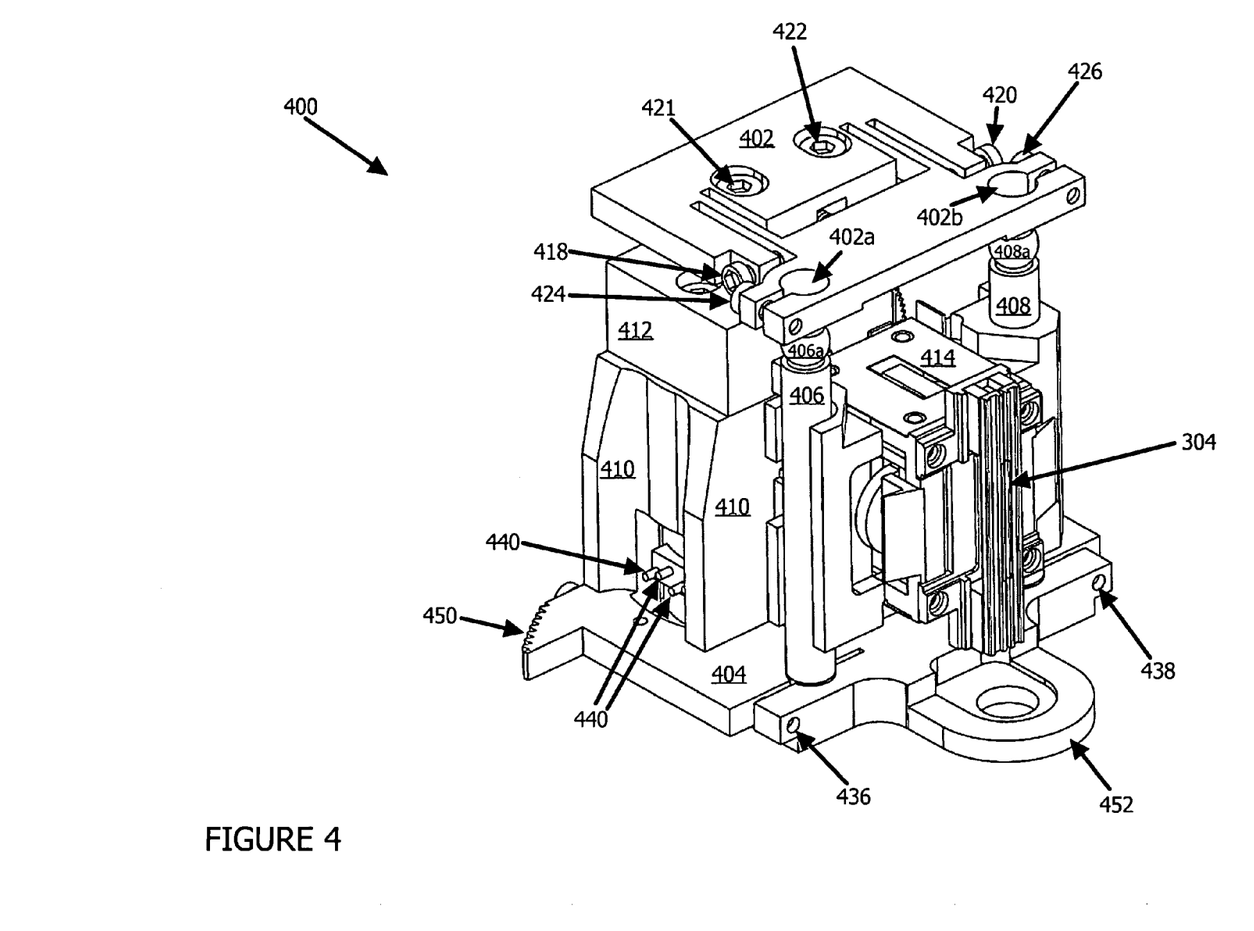
FIG. 4 is an isometric view of an actuator assembly that includes a magnetic head adjustment system, in accordance with an example embodiment.

FIG. 3 is a top-down view of the cartridge 10 inserted into the tape drive 200 which includes a magnetic head adjustment system that incorporates aspects of the claimed embodiments. A full description of the various components of drive 200 is intentionally not included in order to not unnecessarily obscure the claimed embodiments. However, some of the major components include a take-up hub 300, various tape-threading roller guides (302, 306), magnetic head 304 and head flex circuits (310, 312). Drive 200 will also typically contain one or more processors, a memory and a controller.

One possible implementation of the invention is detailed in reference to FIGS. 4-9 which show various views of an actuator assembly that includes a magnetic head adjustment system and related parts thereof. Actuator assembly 400 primarily includes a top plate 402, a bottom plate 404, a pair of ball-ended guide rods (406, 408). In between the top plate 402 and the bottom plate 404 is a base structure 410, a retaining cap 412 and a magnetic head assembly 414 which includes the magnetic head 304.

As the name suggests, the ball-ended guide rods (406, 408) have ends (406a, 406b, 408a, 408b/refer to FIG. 9 to view 406b and 408b) that are ball-shaped. Each of the ends (206a, 406b, 408a, 408b/refer to FIG. 9 to view 408a and 408b) mates with a corresponding socket (402a, 402b, 404a, 404b) on the top or bottom plate (406, 408). The claimed embodiments can also utilize other shapes for the ball-ended guide rods (406, 408) such as a slightly oval shape or a slightly elliptical shape.

Azimuth and zenith adjustment is provided for via adjustment screws. Specifically, zenith adjustment screw 416 (see FIG. 8) provides for the zenith adjustment (in and out from the tape travel path) and azimuth adjust screws (418, 420) provide for the azimuth adjustment (parallel to the tape travel path). When a desired azimuth and a desired zenith are achieved, zenith clamp screws (421, 422) and guide rod clamp screws (424, 426) are tightened. Once the zenith clamps screws (420, 422) are tightened, additional movement of the magnetic head into and out of the tape travel path is inhibited. Tightening of the guide rod clamp screws (424, 426) also inhibit zenith movement and further inhibits movement of the magnetic head in the azimuth/parallel to the tape travel path. Additional screws (not shown) are also utilized at 436 and 438 to secure the ends (406b, 408b) to the baseplate 404.

Adjustment of the azimuth and the zenith is possible since the top plate 402 is movable, to a degree, due to the ball-shaped ends (406a, 408a) that are mated with the corresponding sockets (402a, 402b) in the top plate 402. For example, as the zenith of the magnetic head 304 is adjusted via the azimuth adjust screw (416), top plate 402 and the guide rods (406, 408) will also move. The magnetic head assembly 414 is slidably coupled to the guide rods (406, 408). As a result, the magnetic head assembly 414, and the magnetic head 304, will also move when the zenith adjust screw 416 is adjusted. In a similar manner, the magnetic head 304 will also move when the azimuth adjust screws (418, 420) are adjusted.

Figure 5:
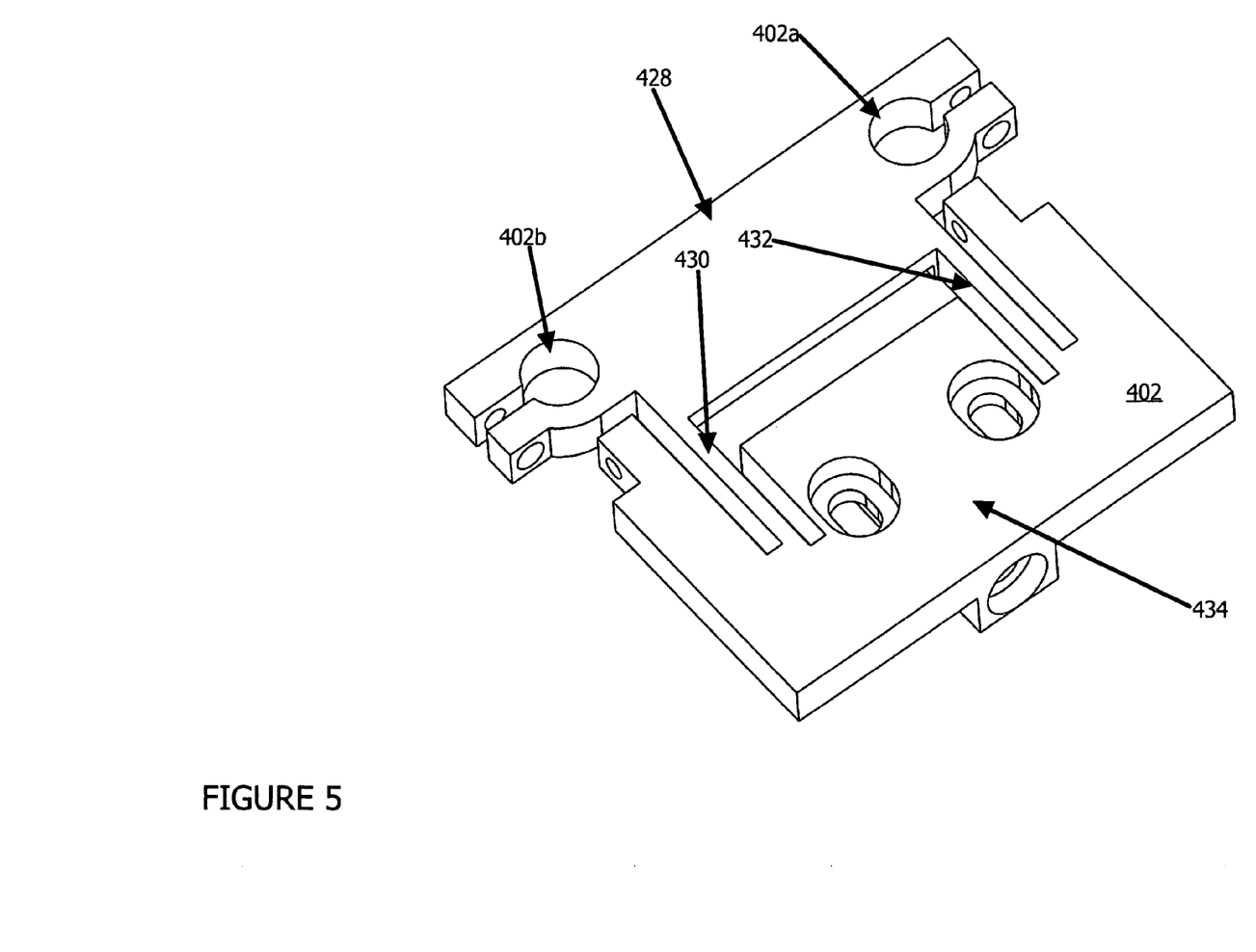
FIG. 5 is an isometric view of a top plate of the magnetic head adjustment system, in accordance with an example embodiment.
Figure 6:
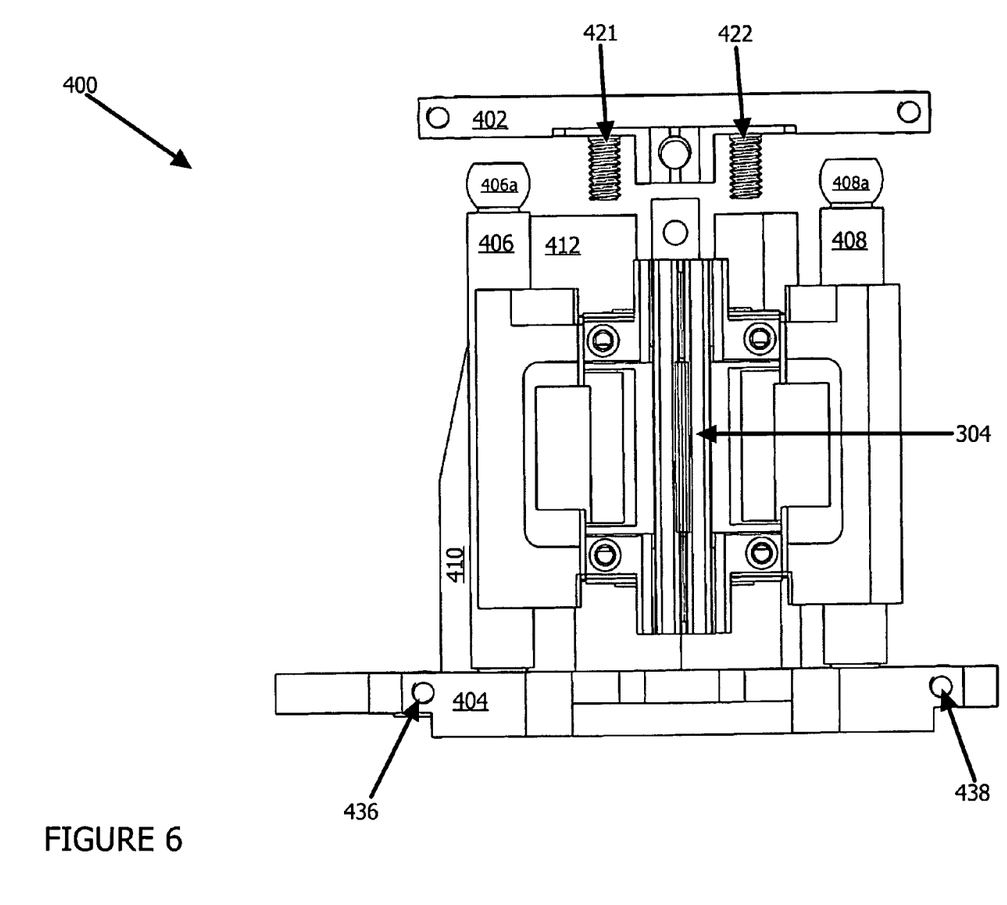
FIG. 6 is a front elevation view of the actuator assembly, in accordance with an example embodiment.
Figure 7:
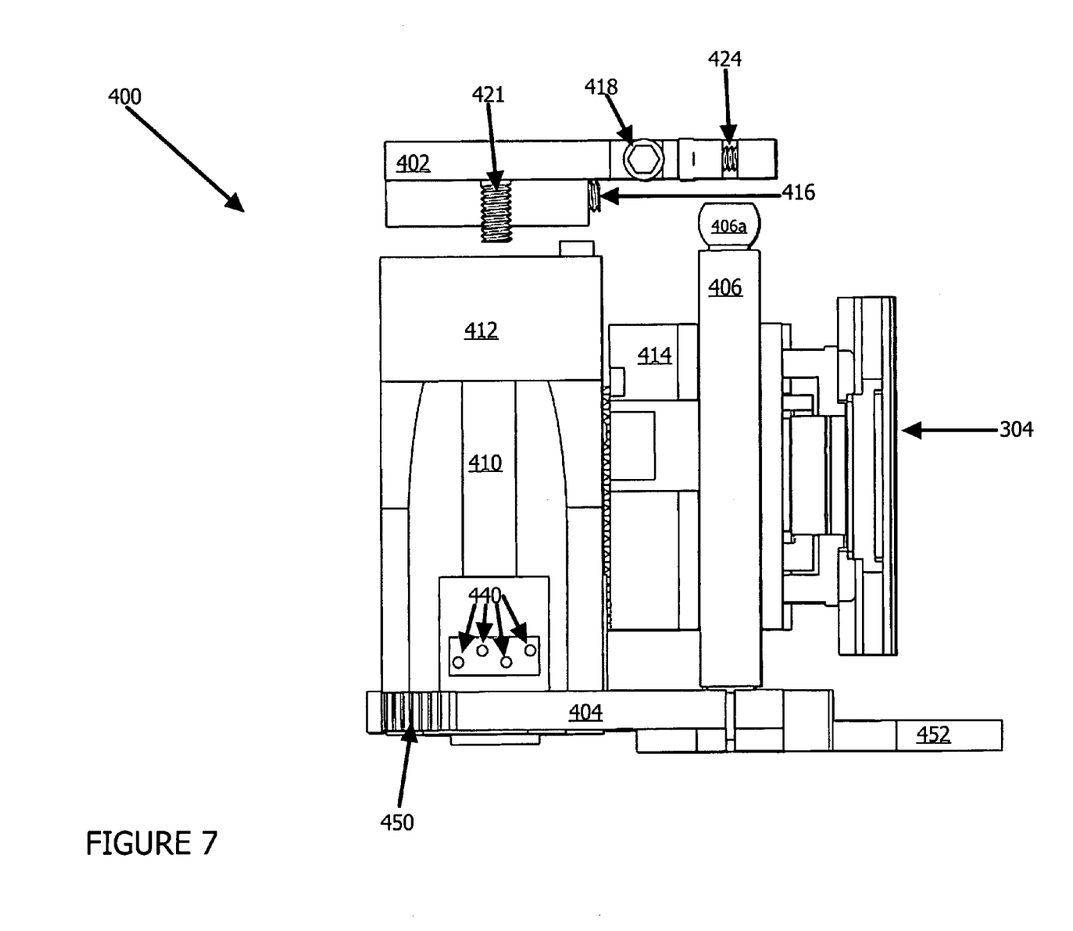
FIG. 7 is a side elevation view of the actuator assembly, in accordance with an example embodiment.

Referring to FIG. 5 which is an isometric view of the top plate 402, the top plate 402 is configured with flexures (430, 432) in a four-bar linkage pattern. This flexure configuration allows for precise azimuth adjustment of the magnetic head 304 while maintaining a high degree of stiffness in the vertical direction. The four bars of the four bar linkage pattern include the flexures (430, 432), a front portion 428 of the top plate 402 and a back portion 434 of the top plate 402. The four-bar linkage pattern provides the top plate 402 with the property of being able to apply a force to one corner of the top plate 402 and opposing sides of the top plate 402 will remain parallel to each other. While opposite sides of the top plate remain parallel, adjacent sides will no longer be perpendicular to each other.

When screws 418 and 420 (refer to FIG. 4) are tightened, the flexures (430, 432) will deform. However, front portion 428, which corresponds generally to the location of ends 406a and 408a, will remain parallel to its original location before the screws (418, 420) were tightened. Due to this, front portion 428 will not become skewed at an odd angle which would translate to the magnetic head 304 also being skewed at an odd angle.

Since the flexures (430, 432) are made from the top plate 402, a reduction of parts is achieved as prior art magnetic head adjustment systems will typically include flexures as discrete parts. The reduction of parts is additionally advantageous in that it contributes to a space savings in a tape drive enclosure.

The claimed embodiments also have other advantages. One advantage is that adjusting the azimuth will not affect the zenith. Similarly, adjusting the zenith will not affect the azimuth. Adjustment of the zenith and azimuth is mutually perpendicular. Due to this, there is no interaction between the zenith and azimuth. Another advantage is that the top plate 402 will generally not move up or down when the zenith or azimuth is adjusted. Due to this feature, a tape drive design does not need to allow for extra room above the top plate 402 to allow it to move in the vertical direction during zenith and azimuth adjustments.

Figure 8:
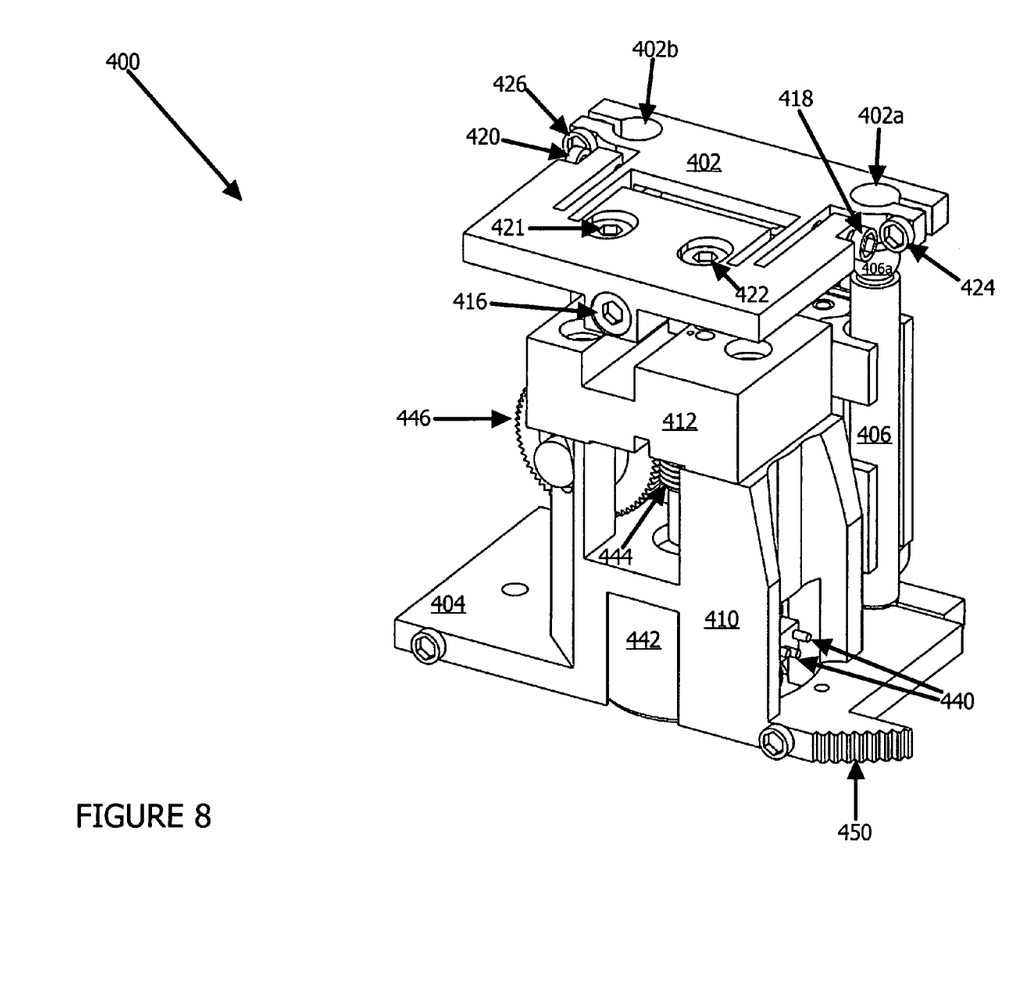
FIG. 8 is another isometric view of the actuator assembly, in accordance with an example embodiment.
Figure 9:
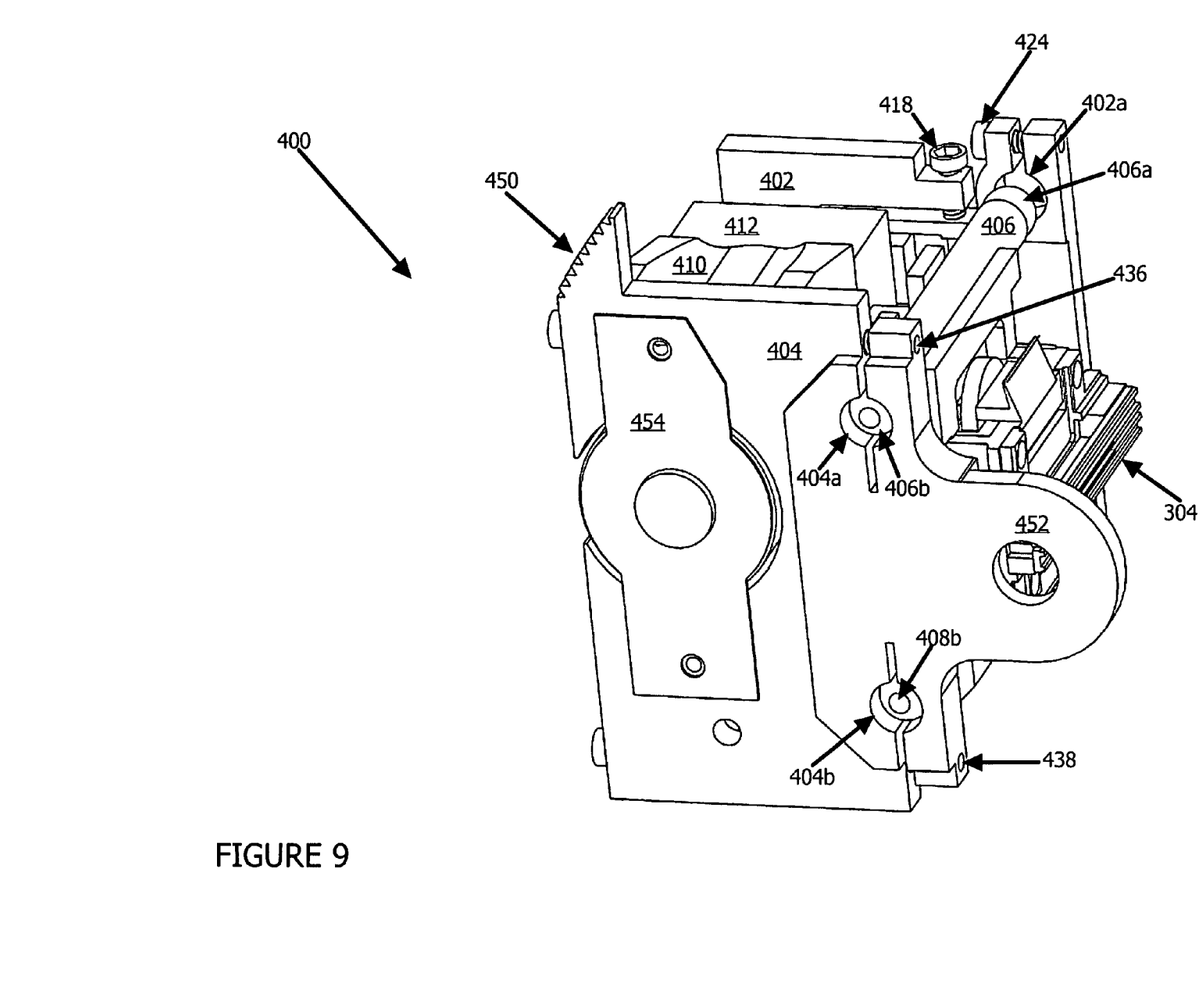
FIG. 9 is yet another isometric view of the actuator assembly, in accordance with an example embodiment.

For completeness, the next sections describe various parts depicted in the figures that work in conjunction with the claimed embodiments. Referring to FIG. 8, stepper motor terminals 440 provide a power inlet for stepper motor 442. Stepper motor 442 rotates threaded barrel 444 which in turn drives gear 446. Gear 446 in cooperation with other parts that are not shown in the figures move the magnetic head assembly 414 along the guide rods (406, 408). The stepper motor 442, threaded barrel 444, gear 446, retaining cap 412, base structure 410, retaining cap 412 and the guide rods (406, 408) form what is known as a coarse positioning structure. Cover/clamping plate 454 (refer to FIG. 9) holds the stepper motor 442 in place.

Gear teeth 450 works in conjunction with structure 452 to rotate the entire actuator assembly 400 to equalize a tape wrap angle. Structure 452 is utilized to pivotally attach baseplate 404 to part of a tape drive and gear teeth 450 are engaged by a gear that is not shown in the figures. The tape wrap angle is the angle between the plane of the tape, as it approaches or leaves the magnetic head 304, and tape guiding surfaces on the head.

Referring to FIGS. 4, 6 and 8-9, it can be seen that the base structure fully surrounds guide rod 408 while guide rod 406 is only partially enclosed. This is done so that the alignment of the moving section of the coarse positioner structure is controlled only by guide rod 408 as the base structure 410 wraps tightly around the guide rod 408. The guide rod 406 provides a stop for the moving section, of the coarse positioning structure, to keep it from rotating. What is not shown is a small spring-loaded flap which rides on the guide rod 406 to keep the coarse positioning structure pressing lightly on the guide rod 406.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a tape drive system, an apparatus for adjusting azimuth and zenith of a magnetic head attached to an actuator assembly, the apparatus comprising:

a base plate;
a top plate;
the actuator assembly coupled to the base plate and the top plate;
first and second ball-ended guide rods;
at least one azimuth adjust screw, coupled to the top plate, for adjusting the azimuth;
at least one zenith adjust screw, coupled to the top plate, for adjusting the zenith;
wherein top ends of the first and second ball-ended guide rods are mated with corresponding top plate sockets;
wherein bottom ends of the first and second ball-ended guide rods are mated with corresponding bottom plate sockets.

2. The apparatus as recited in claim 1 wherein the top and bottom ends of the first and second ball-ended guide rods are generally ball-shaped.

3. The apparatus as recited in claim 1 wherein the at least one azimuth adjust screw is two azimuth adjust screws which are coupled to the top plate perpendicular to the at least one zenith adjust screw.

4. The apparatus as recited claim 1 wherein adjusting the at least one zenith adjust screw does not affect the azimuth.

5. The apparatus as recited in claim 1 wherein adjusting the at least one azimuth adjust screw does not affect the zenith.

6. The apparatus as recited in claim 1 wherein adjusting the at least one zenith adjust screw does not affect the azimuth and wherein adjusting the at least one azimuth adjust screw does not affect the zenith.

7. The apparatus as recited in claim 1 wherein the top plate further comprises two integral flexible arms that are utilized for the azimuth.

8. The apparatus as recited in claim 1 wherein the top plate substantially remains in a horizontal plane when the at least one azimuth adjust screw or the at least one zenith screw is adjusted.

9. The apparatus as recited in claim 1 further comprising clamp screws coupled to the top plate wherein the top screws are utilized to lock a selected azimuth and a selected zenith in place.

10. In a tape drive system, an apparatus for adjusting azimuth and zenith of a magnetic head attached to an actuator assembly, the apparatus comprising:
a base plate;
a top plate;
the actuator assembly coupled to the base plate and the top plate;
first and second ball-ended guide rods;
at least one azimuth adjust screw, coupled to the top plate, for adjusting the azimuth;
at least one zenith adjust screw, coupled to the top plate, for adjusting the zenith;
wherein top ends of the first and second ball-ended guide rods are mated with corresponding top plate sockets;
wherein bottom ends of the first and second ball-ended guide rods are mated with corresponding bottom plate sockets;
wherein adjusting the at least one zenith adjust screw does not affect the azimuth;
wherein adjusting the at least one azimuth adjust screw does not affect the zenith; and
wherein the top plate substantially remains in a horizontal plane when the at least one azimuth adjust screw or the at least one zenith screw is adjusted.

11. The apparatus as recited in claim 10 wherein the top and bottom ends of the first and second ball-ended guide rods are generally ball-shaped.

12. The apparatus as recited in claim 11 wherein the at least one azimuth adjust screw is two azimuth adjust screws which are coupled to the top plate perpendicular to the at least one zenith adjust screw.

13. The apparatus as recited in claim 11 wherein the top plate further comprises two integral flexible arms that are utilized for the azimuth.

14. The apparatus as recited in claim 11 further comprising clamp screws coupled to the top plate wherein the top screws are utilized to lock a selected azimuth and a selected zenith in place.

15. In a tape drive system, an apparatus for adjusting azimuth and zenith of a magnetic head attached to an actuator assembly wherein the apparatus includes a top plate, a bottom plate, at least one azimuth adjust screw and at least one zenith adjust screw and wherein the actuator assembly is coupled between the top plate and the bottom plate, the improvement comprising:
first and second ball-ended guide rods wherein top ends of the first and second ball-ended guide rods are mated with corresponding top plate sockets and wherein bottom ends of the first and second ball-ended guide rods are mated with corresponding bottom plate sockets.

16. The tape drive system as recited in claim 15 wherein the top and bottom ends of the first and second ball-ended guide rods are generally ball-shaped.

17. The tape drive system as recited in claim 15 wherein the improvement further comprises adjusting the at least one zenith adjust screw which does not affect the azimuth and adjusting the at least one azimuth adjust screw which does not affect the zenith.

18. The tape drive system as recited in claim 15 wherein the improvement further comprises the top plate remaining substantially in a horizontal plane when the at least one azimuth adjust screw or the at least one zenith screw is adjusted.

* * * * *